United States Patent
Rajput et al.

(10) Patent No.: US 12,206,649 B2
(45) Date of Patent: Jan. 21, 2025

(54) METHODS, SYSTEMS, AND COMPUTER READABLE MEDIA FOR SELECTIVE INTER-PUBLIC LAND MOBILE NETWORK (PLMN) SECURITY HANDSHAKE VALIDATION

(71) Applicant: Oracle International Corporation, Redwood Shores, CA (US)

(72) Inventors: Jay Rajput, Bangalore (IN); Virendra Singh, Bangalore (IN); John Nirmal Mohan Raj, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 302 days.

(21) Appl. No.: 17/825,523

(22) Filed: May 26, 2022

(65) Prior Publication Data
US 2023/0388273 A1    Nov. 30, 2023

(51) Int. Cl.
*H04L 9/40*   (2022.01)
*H04W 4/70*   (2018.01)
*H04W 48/18*  (2009.01)
*H04W 80/06*  (2009.01)
*H04W 84/04*  (2009.01)
*H04W 88/18*  (2009.01)

(52) U.S. Cl.
CPC ........ *H04L 63/0281* (2013.01); *H04L 63/166* (2013.01); *H04W 4/70* (2018.02); *H04W 48/18* (2013.01); *H04W 80/06* (2013.01); *H04W 84/042* (2013.01); *H04W 88/182* (2013.01)

(58) Field of Classification Search
None
See application file for complete search history.

(56) References Cited

U.S. PATENT DOCUMENTS

2007/0218898 A1* 9/2007 Agarwal ................. H04W 8/02
                                                    455/433
2022/0248229 A1* 8/2022 Bharathi Somashekar ................
                                                    H04W 12/102

OTHER PUBLICATIONS

3GPP TSG SA WG3 (security) meeting #91—Apr. 16-Apr. 20, 2018 (Year: 2018).*

(Continued)

*Primary Examiner* — Younes Naji
(74) *Attorney, Agent, or Firm* — Jenkins, Taylor & Hunt, P.A.

(57) ABSTRACT

A method for selective inter-PLMN security handshake validation includes receiving, at a SEPP, a first inter-PLMN security handshake request message. The method further includes performing, by the SEPP and in an SEPP trust relationship database, a lookup to determine whether the first inter-PLMN security handshake request message originates from a trusted SEPP. The method further includes determining that the first inter-PLMN security handshake request message does not originate from a trusted SEPP, and, in response, performing, by the SEPP, an inter-PLMN security handshake validation procedure on the first inter-PLMN security handshake request message. The method further includes determining that the first inter-PLMN security handshake request message fails the inter-PLMN security handshake validation procedure, and, in response, performing a network protective operation.

12 Claims, 9 Drawing Sheets

(56) References Cited

OTHER PUBLICATIONS

"3rd Generation Partnership Project; Technical Specification Group Services and System Aspects; Procedures for the 5G System (5GS); Stage 2 (Release 17)," 3GPP TS 23.502, V17.4.0, pp. 1-738 (Mar. 2022).

"3rd Generation Partnership Project; Technical Specification Group Services and System Aspects; Security architecture and procedures for 5G system (Release 17)," 3GPP TS 33.501, V17.5.0, pp. 1-293 (Mar. 2022).

"3rd Generation Partnership Project; Technical Specification Group Core Network and Terminals; Numbering, addressing and identification; (Release 17)," 3GPP TS 23.003, V17.5.0, pp. 1-146 (Mar. 2022).

"3rd Generation Partnership Project; Technical Specification Group Core Network and Terminals; 5G System; Public Land Mobile Network (PLMN) Interconnection; Stage 3 (Release 17)," 3GPP TS. 29.573, V17.4.0, pp. 1-106 (Mar. 2022).

"3rd Generation Partnership Project; Technical Specification Group Core Network and Terminals; 5G System; Principles and Guidelines for Services Definition; Stage 3 (Release 17)," 3GPP TS 29.501, V17.5.0, pp. 1-80 (Mar. 2022).

"3rd Generation Partnership Project; Technical Specification Group Services and System Aspects; System architecture for the 5G System (5GS); Stage 2 (Release 17)," 3GPP TS 23.501, V17.4.0, pp. 1-567 (Mar. 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

\* cited by examiner

METHODS, SYSTEMS, AND COMPUTER READABLE MEDIA FOR SELECTIVE INTER-PUBLIC LAND MOBILE NETWORK (PLMN) SECURITY HANDSHAKE VALIDATION

TECHNICAL FIELD

The subject matter described herein relates to security validation for interfaces between PLMNs. More particularly, the subject matter described herein relates to methods, systems, and computer readable media for selective inter-PLMN security handshake validation.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One security issue in 5G and other types of networks is that performing inter-PLMN security handshake validation is not required or defined by 3GPP standards. 3GPP TS 29.573 defines an N32-c (control plane) handshake procedure between SEPPs before setting up an N32-c connection between PLMNs. The purpose of the N32-c handshake procedure is to exchange security capability information to be used between PLMNs for the N32-f (forwarding) interface. 3GPP TS 29.573 does not provide a validation mechanism for N32-c handshake data that is exchanged during the N32-c handshake procedure. As a result, if no validation is performed, a hacker can register fake PLMN data with a responding SEPP during the N32-c handshake procedure and use the fake PLMN data to eavesdrop on communications intended for another PLMN.

One possible solution to lack of security during the N32-c handshake procedure is to validate the data exchanged in the N32-c handshake. However, validating the data exchanged during the N32-c handshake procedure requires static configuration of inter-PLMN handshake validation data at the SEPP. Such static configuration can be burdensome on network operators as the network operators are required to configure the inter-PLMN handshake validation data for every change in network configuration. In light of the numbers of networks and changes in configurations, performing N32-c handshake validation for every N32-c handshake is undesirable.

In light of these and other difficulties, the exists an need for selective inter-PLMN security handshake validation.

SUMMARY

A method for selective inter-public land mobile network (inter-PLMN) security handshake validation includes receiving, at a security edge protection proxy (SEPP), a first inter-PLMN security handshake request message. The method further includes performing, by the SEPP and in an SEPP trust relationship database, a lookup to determine whether the first inter-PLMN security handshake request message originates from a trusted SEPP. The method further includes determining, by the SEPP and based on the lookup, that the first inter-PLMN security handshake request message does not originate from a trusted SEPP. The method further includes, in response to determining that the first inter-PLMN security handshake request message does not originate from a trusted SEPP, performing, by the SEPP, a security handshake validation procedure on the first inter-PLMN security handshake request message. The method further includes that the first inter-PLMN security handshake request message fails the inter-PLMN security handshake validation procedure. The method further includes, in response to determining that the first inter-PLMN security handshake request message fails the inter-PLMN security handshake validation procedure, performing a network protective operation.

According to another aspect of the subject matter described herein, receiving the first inter-PLMN security handshake request message includes receiving an HTTP POST message for initiating an N32-c security capability negotiation procedure.

According to another aspect of the subject matter described herein, performing the lookup in the SEPP trust relationship database includes reading SEPP-identifying information from N32-c security negotiation request data carried in the HTTP POST message and using the SEPP-identifying information read from the N32-c security negotiation request data to perform the lookup in the SEPP trust relationship database.

According to another aspect of the subject matter described herein, using the SEPP-identifying information read from the N32-c security negotiation request data to perform the lookup includes using a sender fully qualified domain name (FQDN) from the N32-c security negotiation request data to perform the lookup in the SEPP trust relationship database.

According to another aspect of the subject matter described herein, determining that the first inter-PLMN security handshake request message does not originate from a trusted SEPP includes determining that the sender FQDN is not present or is identified as untrusted in the SEPP trust relationship database.

According to another aspect of the subject matter described herein, performing the inter-PLMN security handshake validation procedure includes determining whether one or more PLMN identifiers registered in the inter-PLMN security handshake validation database for an originator of the first inter-PLMN security handshake request message matches one or more PLMN identifiers in the first inter-PLMN security handshake request message.

According to another aspect of the subject matter described herein, performing the network protective operation includes rejecting the first inter-PLMN security handshake request message.

According to another aspect of the subject matter described herein, the method for selective inter-PLMN security handshake validation includes receiving, at the SEPP, a second inter-PLMN security handshake request message, performing, by the SEPP and in the SEPP trust relationship database, a lookup to determine whether the second inter-PLMN security handshake request message originates from a trusted SEPP, determining, by the SEPP and based on the lookup, that the second inter-PLMN security handshake request message originates from a trusted SEPP, and, in response to determining that the second inter-PLMN security handshake request message originates from a trusted SEPP, processing the second inter-PLMN security handshake request message without performing the inter-PLMN security handshake validation procedure.

According to another aspect of the subject matter described herein, receiving the second inter-PLMN security handshake request message includes receiving an HTTP POST message for initiating an N32-c security capability negotiation procedure.

According to another aspect of the subject matter described herein, processing the second inter-PLMN security handshake request message includes registering, by the SEPP, a PLMN identifier obtained from the second inter-PLMN security handshake request message as being associated with an originator of the second inter-PLMN security handshake request.

According to another aspect of the subject matter described herein, a system for selective inter-public land mobile network (inter-PLMN) security handshake validation includes a security edge protection proxy (SEPP) including at least one processor and a memory. The system further includes an inter-PLMN security handshake validation database located in the memory. The system further includes an SEPP trust relationship database located in the memory. The system further includes a selective inter-PLMN security handshake validator executable by the at least one processor for receiving a first inter-PLMN security handshake request message, performing, in an SEPP trust relationship database, a lookup to determine whether the first inter-PLMN security handshake request message originates from a trusted SEPP, determining, based on the lookup, that the first inter-PLMN security handshake request message does not originate from a trusted SEPP, in response to determining that the first inter-PLMN security handshake request message does not originate from a trusted SEPP, performing, using data stored in the inter-PLMN security handshake validation database, a security handshake validation procedure on the first inter-PLMN security handshake request message, determining that the first inter-PLMN security handshake request message fails the inter-PLMN security handshake validation procedure, and in response to determining that the first inter-PLMN security handshake request message fails the inter-PLMN security handshake validation procedure, performing a network protective operation.

According to another aspect of the subject matter described herein, the first inter-PLMN security handshake request message includes an HTTP POST message for initiating an N32-c security capability negotiation procedure.

According to another aspect of the subject matter described herein, in performing the lookup in the SEPP trust relationship database, the selective inter-PLMN security handshake validator is configured to read SEPP-identifying information from N32-c security negotiation request data carried in the HTTP POST message and use the SEPP-identifying information read from the N32-c security negotiation request data to perform the lookup in the SEPP trust relationship database.

According to another aspect of the subject matter described herein, the SEPP-identifying information read from the N32-c security negotiation request data comprises a sender fully qualified domain name (FQDN).

According to another aspect of the subject matter described herein, the selective inter-PLMN security handshake validator is configured to determine that the first inter-PLMN security handshake request message does not originate from a trusted SEPP by determining that the sender FQDN is not present or is identified as untrusted in the SEPP trust relationship database.

According to another aspect of the subject matter described herein, the selective inter-PLMN security handshake validator is configured to perform the inter-PLMN security handshake validation procedure by determining whether one or more PLMN identifiers registered with the SEPP for an originator of the first inter-PLMN security handshake request message matches one or more PLMN identifiers in the first inter-PLMN security handshake request message.

According to another aspect of the subject matter described herein, the selective inter-PLMN security handshake validator is configured to perform the network protective operation by rejecting the first inter-PLMN security handshake request message.

According to another aspect of the subject matter described herein, the selective inter-PLMN security handshake validator is configured to receive a second inter-PLMN security handshake request message, perform a lookup in the SEPP trust relationship database to determine whether the second inter-PLMN security handshake request message originates from a trusted SEPP, determine, by the SEPP and based on the lookup, that the second inter-PLMN security handshake request message originates from a trusted SEPP, and, in response to determining that the second inter-PLMN security handshake request message originates from a trusted SEPP, process the second inter-PLMN security handshake request message without performing the inter-PLMN security handshake validation procedure.

According to another aspect of the subject matter described herein, the selective inter-PLMN security handshake validator is configured to process the second inter-PLMN security handshake request message by registering, by the SEPP, a PLMN identifier obtained from the second inter-PLMN security handshake request as being associated with an originator of the second inter-PLMN security handshake request.

According to another aspect of the subject matter described herein, a non-transitory computer readable medium having stored thereon executable instructions that when executed by a processor of a computer controls the computer to perform steps is provided. The steps include receiving, at a security edge protection proxy (SEPP), a first inter-public land mobile network (inter-PLMN) security handshake request message. The steps further include performing, by the SEPP and in an SEPP trust relationship database, a lookup to determine whether the first inter-PLMN security handshake request message originates from a trusted SEPP. The steps further include determining, by the SEPP and based on the lookup, that the first inter-PLMN security handshake request message does not originate from a trusted SEPP. The steps further include, in response to determining that the first inter-PLMN security handshake request message does not originate from a trusted SEPP, performing, by the SEPP a security handshake validation procedure on the first inter-PLMN security handshake request message. The steps further include determining that the first inter-PLMN security handshake request message fails the inter-PLMN security handshake validation procedure. The steps further include, in response to determining that the first inter-PLMN security handshake request message fails the inter-PLMN security handshake validation procedure, performing a network protective operation.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
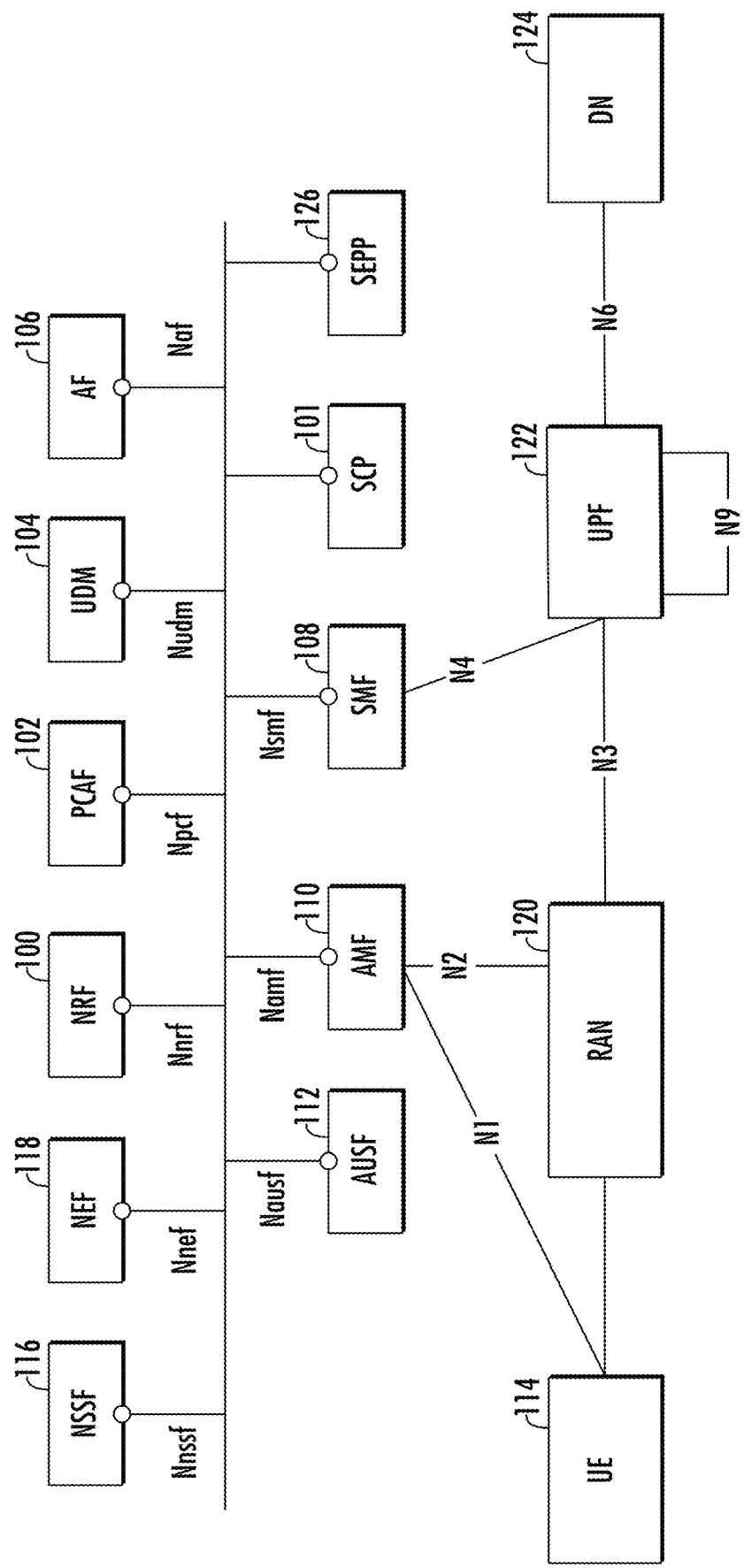
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, unified defined management (UDM) 104 that manages user data, and an application function (AF) 106 that provides application services.

The NFs illustrated in FIG. 1 further include an SMF 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
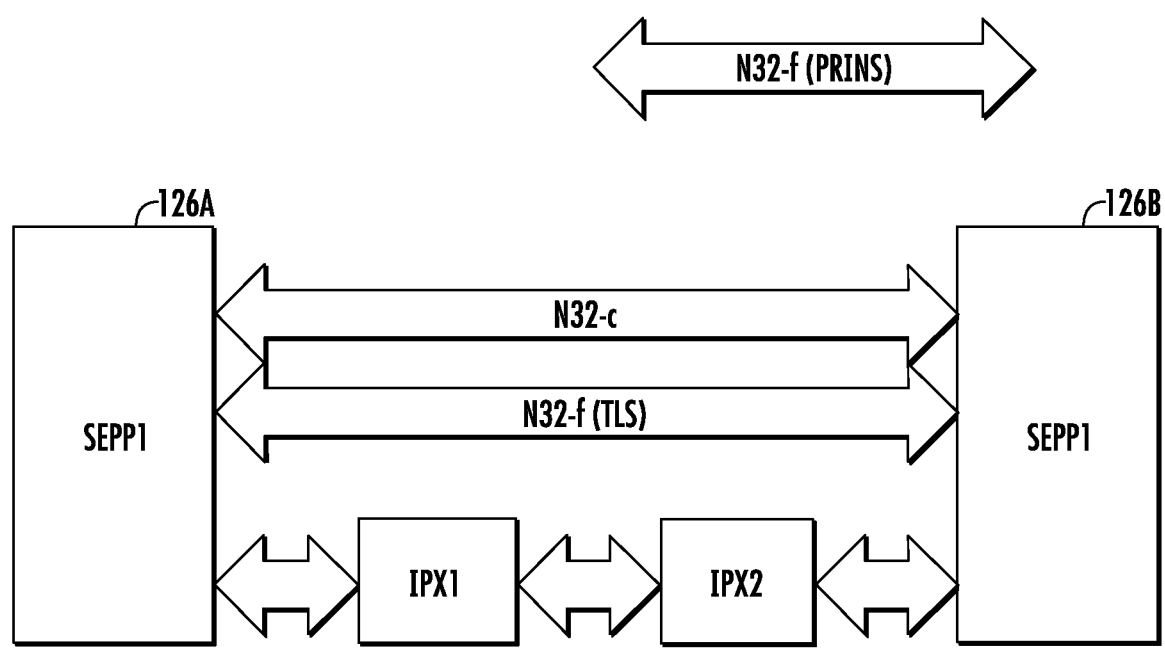
FIG. 2 is a network diagram illustrating inter-PLMN SEPP interfaces.

As stated above, security issues with 5G and other types of networks include the lack of validation of security handshake procedures on inter-PLMN interfaces, such as the N32-c interface, and the burden of manual configuration at the SEPP to perform such validation for every inter-PLMN handshake. FIG. 2 is a network diagram illustrating inter-PLMN interfaces between SEPPs. Referring to FIG. 2, SEPPs 126A and 126B communicate with each other over the N32-c and N32-f interfaces. The N32-c interface is a control plane interface between SEPPs 126A and 126B for performing an initial security handshake and negotiating parameters to be applied for forwarding of data on the N32-f interface. The N32-f interface between SEPPs 126A and 126B is a forwarding interface used for forwarding communications between NF service consumers and NF service producers after applying application level security protection. The N32-f interface can utilize transport layer security (TLS) or protocol for N32 interconnect security (PRINS).

PRINS is only applicable when there are IP exchange (IPX) services in the path between PLMNs. The subject matter described herein relates to methods systems and computer readable media for selectively validating data on the N32-c interface during the N32-c security handshake procedure.

Figure 3:
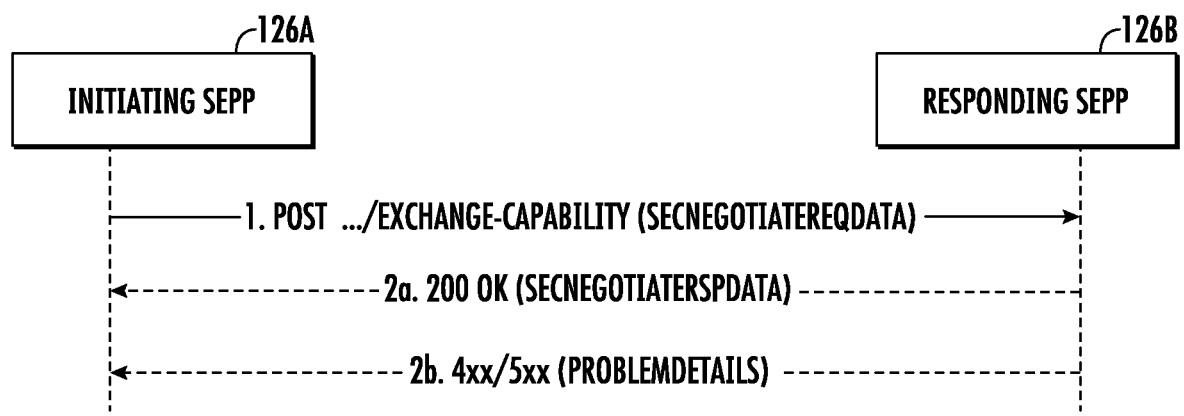
FIG. 3 is a message flow diagram illustrating exemplary messages exchanged for the N32-c security capability negotiation procedure.

FIG. 3 is a message flow diagram illustrating an inter-PLMN security handshake procedure, which is referred to in 3GPP TS 29.573 as the N32-c security capability negotiation procedure. This procedure is used to share security capabilities between an initiating SEPP 126A and a responding SEPP 126B. The purpose of the N32-c security capability negotiation procedure is for the SEPPs to agree on the security procedure to use for N32-f communications. Referring to the message flow in FIG. 3, in line 1, initiating SEPP 126A sends an inter-PLMN security handshake request message to responding SEPP 126B. The inter-PLMN security handshake request message is an HTTP POST message that a secNegotiateReqData information element (IE), which carries a sender FQDN (i.e., the FQDN of initiating SEPP 126A), an identifier for the supported security capabilities (PRINS or TLS), an indicator as to whether the 3gpp-Sbi-Target-apiRoot header is supported, the sender PLMN ID(s) and the target PLMN ID.

If responding SEPP 126B successfully processes the inter-PLMN security handshake request message, responding SEPP 126B responds as indicated in line 2a with a 200 OK message containing a secNegotiateRspData IE, which carries a sender FQDN (i.e., the FQDN of responding SEPP 126B), an identifier for the selected security capability (PRINS or TLS), whether the 3gpp-Sbi-Target-apiRoot HTTP header is supported, the sender PLMN ID(s), and an indicator of the purpose of the accepted N32 connection. If responding SEPP 126B does not successfully process the inter-PLMN security handshake request message, responding SEPP 126B responds as indicated in line 2b with a 4XX or 5XX message indicating problem details. It should be noted that there is no validation mechanism specified in 3GPP TS 29.573 for the data exchanged on the N32-c interface.

Table 1 shown below illustrates exemplary data communicated in the inter-PLMN security handshake request message on the N32-c interface.

TABLE 1

Security Capability Data Carried in Inter-PLMN Security Handshake Request Message

| Attribute Name | Data Type | P | Cardinality | Description |
|---|---|---|---|---|
| sender | fqdn | M | 1 | This IE shall uniquely identify the SEPP that is sending the request. This IE is used to store the negotiated security capability against the right SEPP. |
| supportedSecCapabilityList | array(SecurityCapability) | M | 1 . . . N | This IE shall contain the list of security capabilities that the requesting SEPP supports. |
| 3gpp-Sbi-TargetApiRoot Supported | boolean | C | 0 . . . 1 | This IE should be present and indicate that the 3gpp-Sbi-Target-apiRoot HTTP header is supported, if TLS security is supported for N32-f message forwarding. When present, it shall indicate if TLS |

TABLE 1-continued

Security Capability Data Carried in Inter-PLMN Security Handshake Request Message

| Attribute Name | Data Type | P | Cardinality | Description |
|---|---|---|---|---|
| | | | | security using the 3gpp-Sbi-Target-apiRoot HTTP header is supported: true: supported false (default): not supported |
| plmnIdList | Array (plmnId) | O | 1 . . . N | A list of PLMN IDs associated with the SEPP, which is sending the request. The list to be stored by the receiving SEPP in a N32-f Context (see clause 5.9.3 in 3GPP TS 33.501 |

From Table 1, the inter-PLMN security handshake request message carries the FQDN of the requesting SEPP and a list of PLMNs associated with the requesting SEPP as well as data identifying security capabilities supported by the requesting SEPP.

Table 2 shown below illustrates exemplary data returned in the response to the inter-PLMN security handshake request message.

TABLE 2

Security Capability Data Carried in Inter-PLMN Security Handshake Response Message

| Attribute Name | Data Type | P | Cardinality | Description |
|---|---|---|---|---|
| sender | fqdn | M | 1 | This IE shall uniquely identify the SEPP that is sending the response. This IE is used to store the negotiated security capability against the right SEPP. |
| supportedSecCapabilityList | array(SecurityCapability) | M | 1 . . . N | This IE shall contain the list of security capabilities selected by the responding SEPP. |
| 3gpp-Sbi-Supported TargetApiRoot | boolean | C | 0 . . . 1 | This IE should be present and indicate that the 3gpp-Sbi-Target-apiRoot HTTP header is supported, if TLS security is supported for N32-f message forwarding. When present, it shall indicate if TLS security using the 3gpp-Sbi-Target-apiRoot HTTP header is supported: true: supported false (default): not supported |
| plmnIdList | Array (plmnId) | O | 1 . . . N | A list of PLMN IDs associated with the SEPP, which is sending the request. The list to be stored by the receiving SEPP in a N32-f Context (see clause 5.9.3 in 3GPP TS 33.501) |

Figure 4:
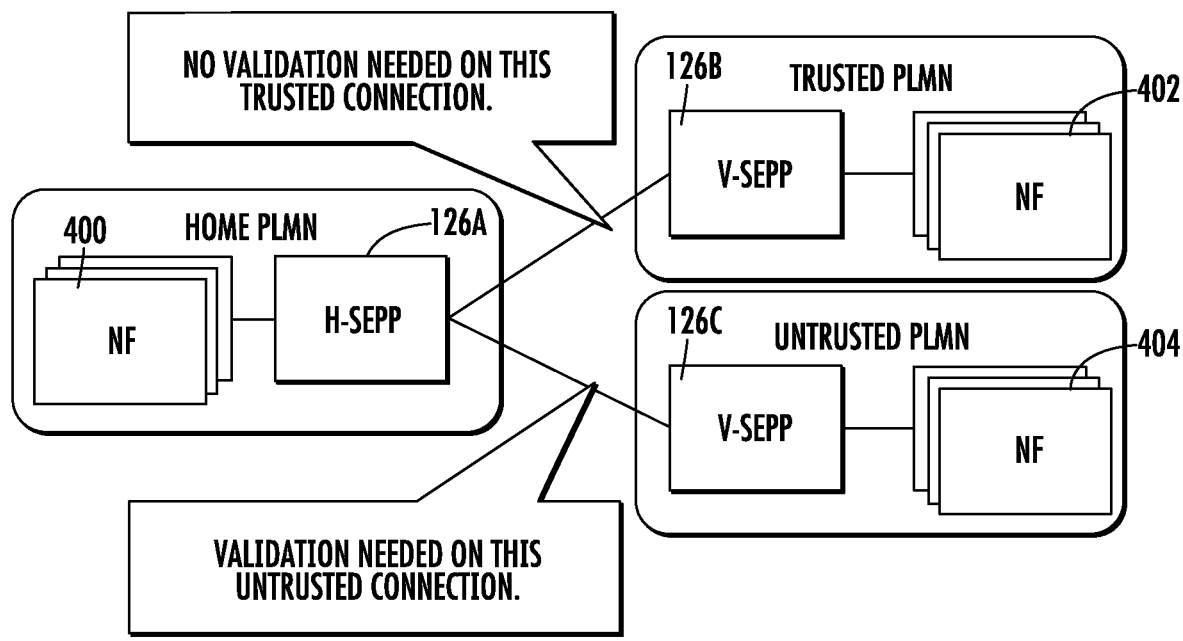
FIG. 4 is a block diagram illustrating the need for selective inter-PLMN security handshake validation.

In general, there exists a need for validation of data exchanged during the N32-c handshake and a mechanism that avoids the need for some of the manual configuration at the SEPP. A solution to this problem is selective N32-c handshake validation. FIG. 4 is a network diagram illustrating the need for selective N32-c handshake validation. In FIG. 4, home SEPP 126A protects communications between network functions 400 in the home PLMN and external PLMNs. Similarly, visited SEPP 126B protects communications between network functions 402 in a visited PLMN and external PLMNs. The PLMN of SEPP 126B is trusted by the operator of the home PLMN. Another visited SEPP 126C protects communications between network functions 404 in another visited PLMN and external PLMNs. The PLMN of SEPP 126C is untrusted by the network operator of the home PLMN.

If home SEPP 126A is configured to validate N32-c handshake data using static configuration for every PLMN, this increases the operational burden on the operator of the home PLMN. There is a need for a mechanism by which home SEPP 126A can perform inter-PLMN security handshake validation for untrusted or unknown PLMNs and refrain from performing N32-c handshake validation for trusted PLMNs.

Figure 5:
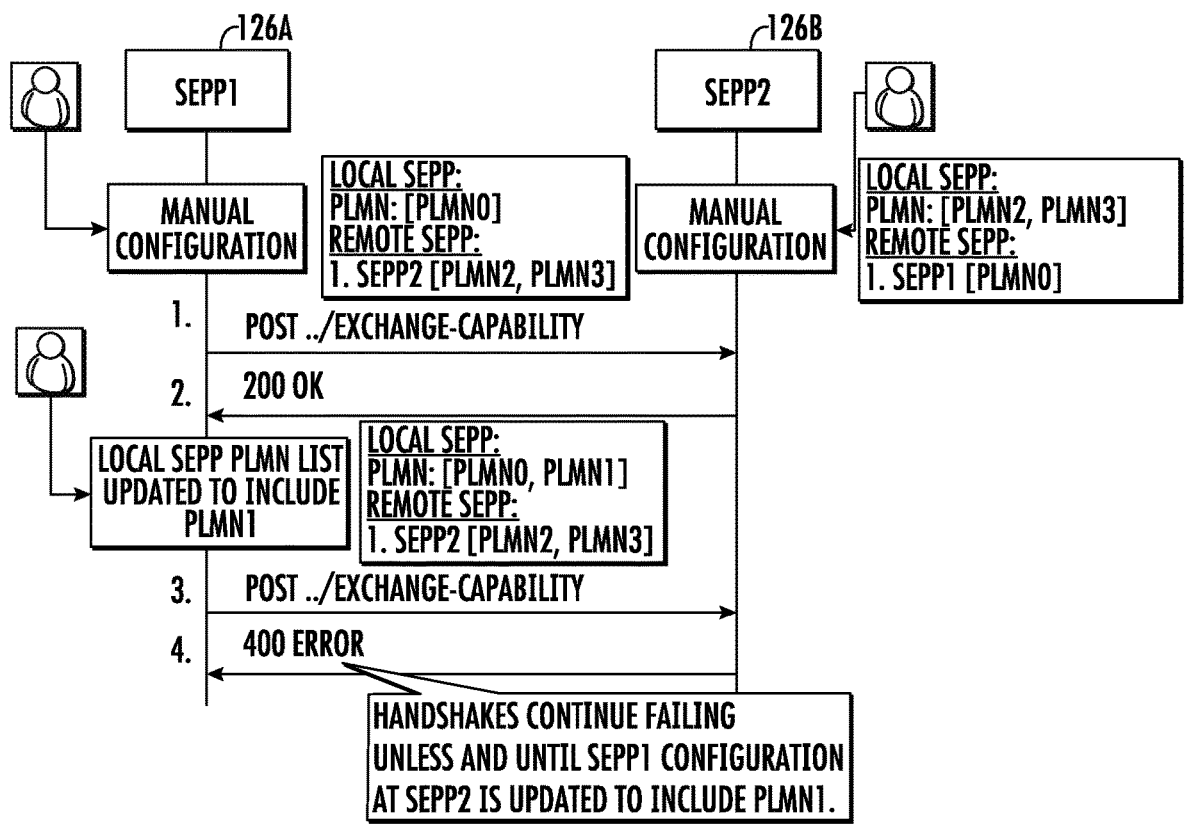
FIG. 5 is a message flow diagram illustrating exemplary messages exchanged inter-PLMN security handshake validation.

FIG. 5 illustrates operational challenges associated with N32-c handshake validation at SEPPs. Referring to FIG. 5, SEPP 126A is manually configured with remote PLMN information for SEPP 126B to be used in verifying N32-c handshake procedures. For example, SEPP 126A is configured with identifiers for PLMN2 and PLMN3 as the PLMNs of SEPP 126B. Similarly, SEPP 126B is manually configured with PLMN0 as the PLMN ID of SEPP 126A. In line 1, SEPP 126A, functioning as the initiating SEPP for the N32-c handshake procedure, sends an inter-PLMN security handshake request message to SEPP 126B. The message identifies PLMN0 as the PLMN of SEPP 126A. SEPP 126B receives the message, validates the PLMN identifier PLMN0 against the manually configured inter-PLMN security handshake validation data, and responds with an inter-PLMN security handshake response message carrying N32-c security capability parameters accepted by SEPP 126B.

When a network configuration change at SEPP 126A causes its local PLMN ID list to include PLMN1 in addition to PLMN0, SEPP 126A sends an inter-PLMN security handshake request message to SEPP 126B to register PLMN1 as an additional PLMN of SEPP 126A. In this example, the local inter-PLMN security handshake validation data stored at SEPP 126B is not up to date. Accordingly, SEPP 126B rejects the inter-PLMN security handshake request message. Keeping the inter-PLMN security handshake validation data at each SEPP in sync with network configuration changes results in operational overhead for network operators.

Figure 6:
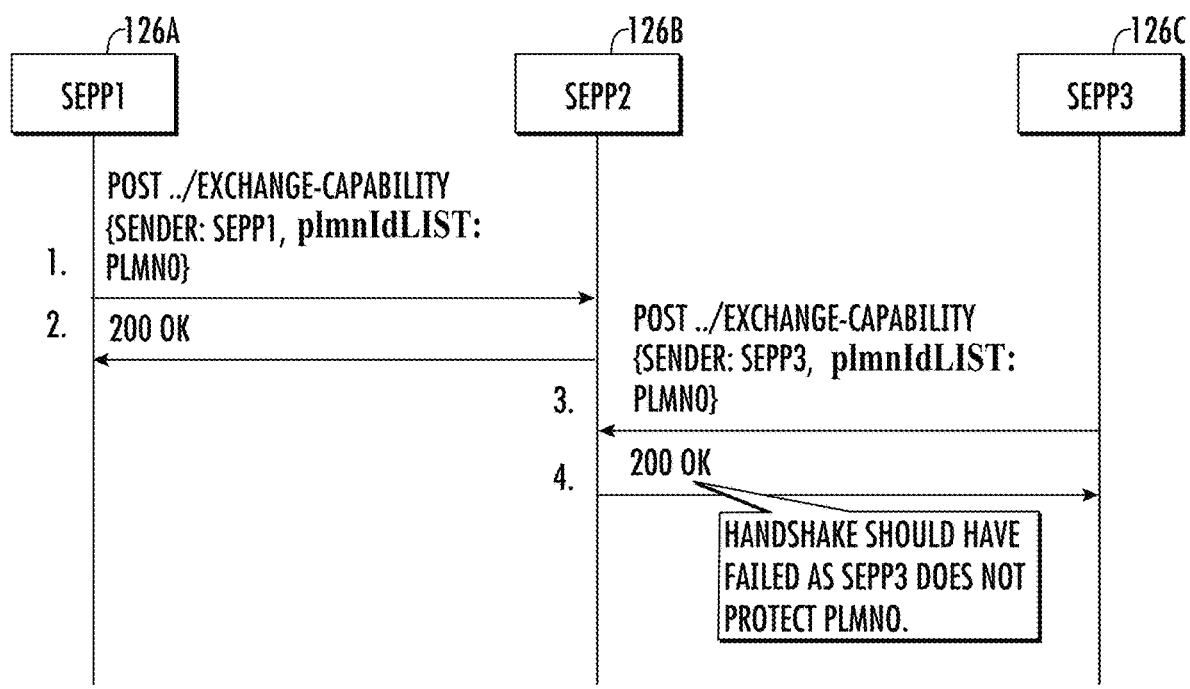
FIG. 6 is message flow diagram illustrating a security issue that can occur if inter-PLMN security handshake validation is not performed.

FIG. 6 illustrates a security issue that can occur when inter-PLMN security handshake validation is not performed. Referring to FIG. 6, in line 1, SEPP 126A initiates an N32-c security capabilities handshake procedure with SEPP 126B. SEPP 126A includes its PLMN Id, PLMN0, in the PLMN ID list in the inter-PLMN security handshake request message. In line 2 of the message flow diagram, SEPP 126B responds with a 200 OK message indicating successful completion of the N32-c handshake procedure.

In line 3 of the message flow diagram, SEPP 126C initiates an N32-c handshake procedure with SEPP 126B. SEPP 126C includes the PLMN ID of the PLMN of SEPP 126A in the inter-PLMN security handshake request message. The N32-c handshake is successful because SEPP 126B does not validate the PLMN ID list presented by SEPP 126C in the inter-PLMN security handshake request message. SEPP 126C should not be able to register a PLMN ID that is outside of the administrative domain of its network operator. Validation at the TLS layer does not restrict an SEPP from using a PLMN that is outside of its network operator's administrative domain. Accordingly, the failure to validate inter-PLMN security handshake messages can allow an untrusted SEPP or a hacker to register a PLMN that it is not authorized to register with another SEPP. Such a result is undesirable as the untrusted SEPP or hacker could receive data intended for the PLMN without authorization.

Figure 7:
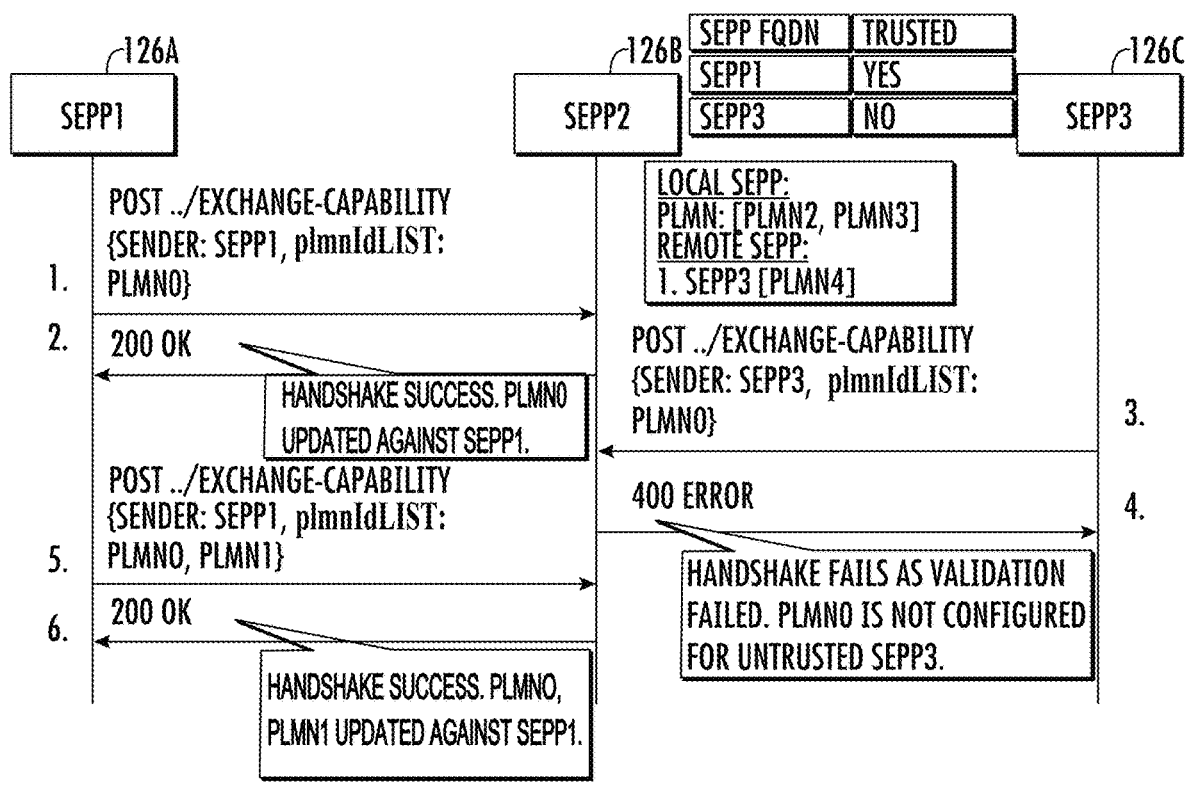
FIG. 7 is a message flow diagram illustrating exemplary message exchanged for selective inter-PLMN security handshake validation.

In order to avoid at least some of these difficulties, an SEPP can be configured to perform selective inter-PLMN security handshake validation based on trust information configured for remote SEPPs. FIG. 7 is a message flow diagram illustrating exemplary messages exchanged for selective inter-PLMN security handshake validation. In FIG. 7, SEPP 126B includes, in addition to a security handshake validation database, an SEPP trust relationship database that contains data indicative of trust relationships with remote SEPPs. In the illustrated example, SEPP 126B is configured to identify SEPP 126A as trusted and SEPP 126C as untrusted. In an alternate implementation, the SEPP trust relationship database may contain the identifiers of trusted SEPPs only, and the absence of an SEPP identifier in the SEPP trust relationship database may indicate that the SEPP is untrusted or unknown. The SEPP trust relationship database may be a security policy database of a network operator that contains security policies defined by the network operator. The SEPP trust relationship database may be shared across SEPPs of the network operator.

Referring to the message flow in FIG. 7, in line 1, SEPP 126A initiates an N32-c handshake with SEPP 126B. SEPP 126B accesses its SEPP trust configuration database using SEPP-identifying information from the inter-PLMN security handshake request message and determines that SEPP 126A is trusted. Accordingly, SEPP 126B accepts and processes the inter-PLMN security handshake request message without performing an inter-PLMN security handshake validation. SEPP 126B registers the PLMN IDs carried in the inter-PLMN security handshake request message as being associated with SEPP 126A. In line 2, SEPP 126B sends a 200 OK message to SEPP 126A containing the security capability information illustrated above in Table 2 and confirming successful processing of the inter-PLMN security handshake request message.

In line 3 of the message flow diagram, SEPP 126C initiates an N32-c handshake procedure with SEPP 126B by sending an inter-PLMN security handshake request message to SEPP 126B. SEPP 126B receives the inter-PLMN security handshake request, performs a lookup in its SEPP trust relationship database using SEPP-identifying information from the message, and determines, based on results of the lookup, that SEPP 126C is untrusted. Accordingly, SEPP 126B performs an inter-PLMN security handshake validation by comparing the PLMN IDs in the PLMN ID list carried in the message with the stored configuration data for SEPP 126C. In this example, SEPP 126C is attempting to register PLMN0, and the configuration data indicates that SEPP 126C should not be able to register PLMN0 because PLMN0 is not configured for untrusted SEPP 126C. Accordingly, in line 4 of the message flow diagram, SEPP 126B rejects the inter-PLMN security handshake request message.

In line 5 of the message flow diagram, SEPP 126A sends a new inter-PLMN security handshake request message to SEPP 126B to update the PLMN list associated with SEPP 126A to include PLMN1. Because SEPP 126A is trusted, SEPP 126B accepts the inter-PLMN security handshake request message, updates the PLMN ID list for SEPP 126A to include PLMN1, and responds in line 6 with a 200 OK message. Thus, performing selective inter-PLMN security handshake validation based on trust relationships enables SEPPs to update their local PLMN ID information with other SEPPs without security validation, while providing security validation for untrusted or unknown SEPPs.

Figure 8:
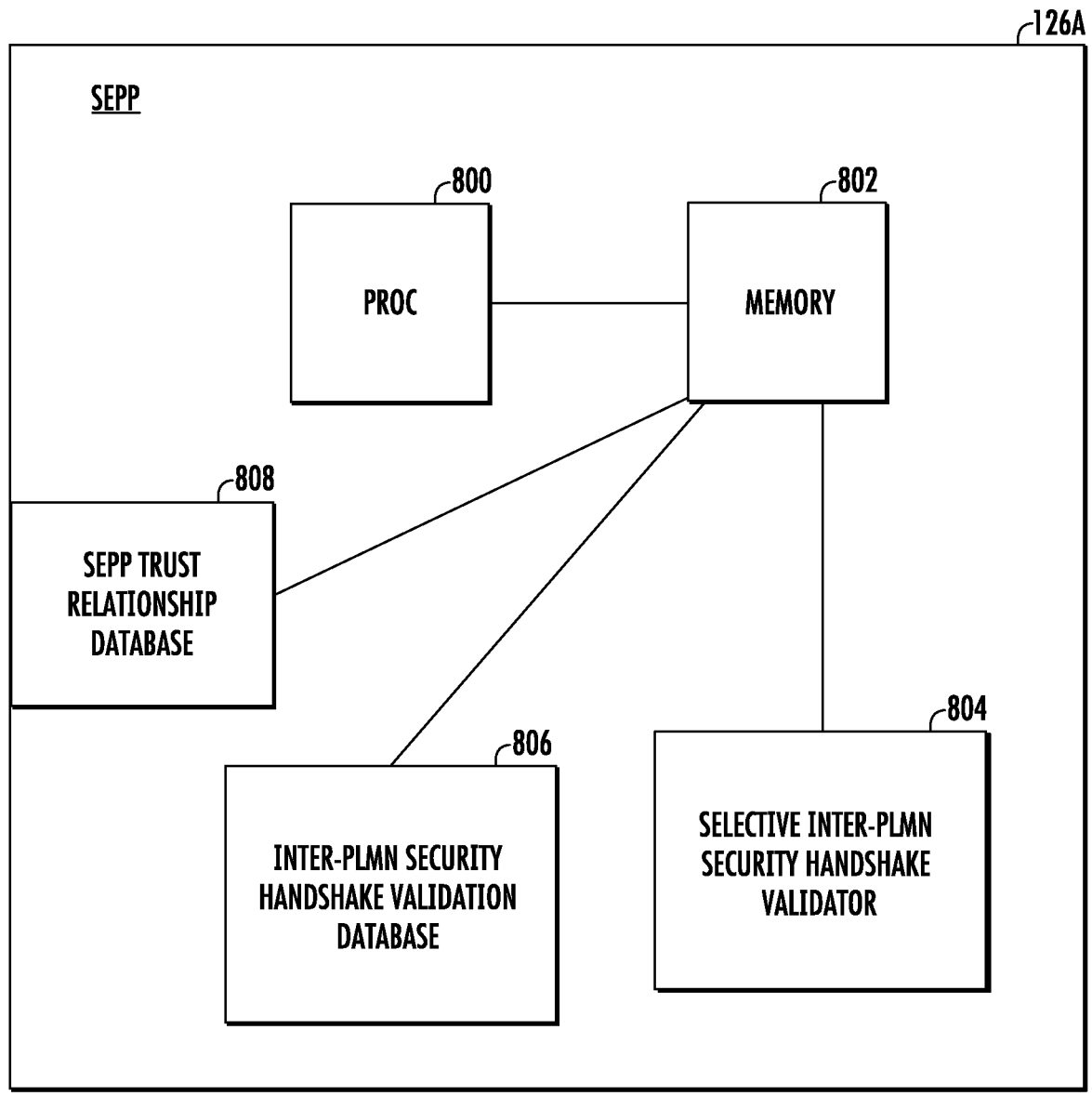
FIG. 8 is a block diagram illustrating an exemplary architecture for an SEPP for performing selective inter-PLMN security data handshake validation.

FIG. 8 is a block diagram illustrating an exemplary architecture for an SEPP capable of performing selective inter-PLMN security handshake validation. Referring to FIG. 8, SEPP 126A includes at least one processor 800 and a memory 802. SEPP 126A further includes a selective inter-PLMN security handshake validator 804 for selectively validating inter-PLMN handshake exchanges. Selective inter-PLMN security handshake validator 804 may access an SEPP trust relationship database 806 to determine whether or not to validate inter-PLMN security handshake exchanges. In one example, SEPP trust relationship database 806 may contain identifiers, such as FQDNs, of trusted SEPPs. In such an implementation, selective inter-PLMN security handshake validator 804 may perform a lookup in SEPP trust relationship database 806 using the sender FQDN read from an inter-PLMN security handshake request message. If the sender FQDN matches one of the FQDNs for trusted SEPPs in SEPP trust relationship database 806, selective inter-PLMN security handshake validator 804 may determine that the SEPP is trusted and register the PLMN IDs carried in the inter-PLMN security handshake request message without performing the inter-PLMN security handshake validation procedure. As described above, in another implementation, SEPP trust relationship database 806 may contain identifiers of trusted SEPPs and untrusted SEPPs along with indicators that identify the SEPPs as trusted or untrusted.

If selective inter-PLMN security handshake validator 804 determines that an inter-PLMN security handshake validation procedure is needed, selective inter-PLMN security handshake validator 804 may implement the inter-PLMN security handshake validation procedure by performing a lookup in an inter-PLMN security handshake validation database 808 using the sender FQDN from the inter-PLMN security handshake request message. Inter-PLMN security handshake validation database 808 may contain entries indexed by SEPP identifiers, such as FQDNs, and corresponding lists of PLMN IDs that each SEPP is permitted to register.

If the lookup in inter-PLMN security handshake validation database 808 fails to locate an entry corresponding to the sender FQDN, validation may fail. If the lookup results in an entry corresponding to the sender FQDN, selective inter-PLMN security handshake validator 804 may read the PLMN IDs stored in the PLMN ID list in the entry, compare the PLMN IDs read from the database entry to the PLMN IDs in the message, and if the PLMN IDs in the database entry match those in the message, accept and process the message. If the PLMN IDs in the database entry do not match the PLMN IDs in the message, selective inter-PLMN security handshake validator 804 may reject the message. Selective inter-PLMN security handshake validator 804 may be implemented using computer executable instructions stored in memory 802 and executed by processor 800. SEPP trust relationship database 806 and inter-PLMN security handshake validation database may be stored in memory 802.

Figure 9:
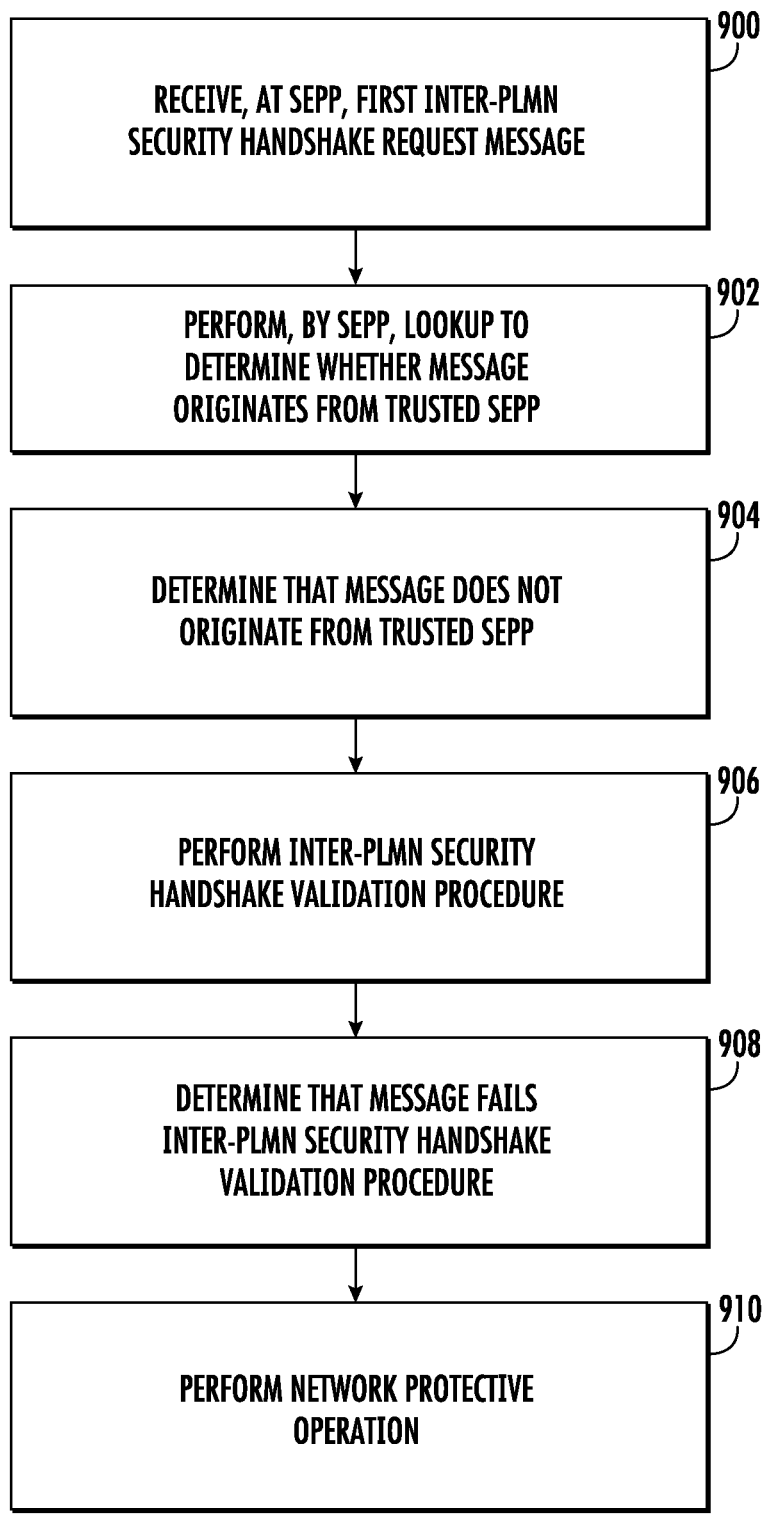
FIG. 9 is a flow charge illustrating an exemplary process for selective inter-PLMN security handshake validation.

FIG. 9 is a flow chart illustrating an exemplary process for selective inter-PLMN security handshake validation. Referring to FIG. 9, in step 900, the process includes receiving, at an SEPP, a first inter-PLMN security handshake request message. For example, selective inter-PLMN security handshake validator 804 may receive a request for initiating an N32-c security capability exchange procedure. As described above with regard to FIG. 3, the request may be an HTTP POST message that carries N32-c security capabilities information.

In step 902, the process includes performing, by the SEPP and in an SEPP trust relationship database, a lookup to determine whether the first inter-PLMN security handshake request message originates from a trusted SEPP. For example selective inter-PLMN security handshake validator 804 may determine whether the originator of the inter-PLMN security handshake request message is a trusted SEPP by performing a lookup in SEPP trust relationship database 806 using SEPP-identifying information read from the inter-PLMN handshake request message. In one example, the SEPP-identifying information comprises the sender FQDN read from the security negotiate request data carried by the inter-PLMN security handshake request message. Selective inter-PLMN security handshake validator 804 may compare the sender FQDN read from the message to FQDN values in SEPP trust relationship database 806.

In step 904, the process includes determining, by the SEPP and based on the lookup, that the first inter-PLMN security handshake request message does not originate from a trusted SEPP. For example, inter-PLMN security handshake validator 804 may determine that the sender FQDN read from the inter-PLMN security handshake request message is not present or is present and is identified as untrusted in SEPP trust relationship database 806.

In step 906, the process includes, in response to determining that the first inter-PLMN security handshake request message does not originate from a trusted SEPP, performing a security handshake validation procedure on the first inter-PLMN security handshake request message. For example, selective inter-PLMN security handshake validator 804 may read the PLMN ID list and the sender FQDN from the first inter-PLMN security handshake request message, perform a lookup in inter-PLMN security handshake validation database 808 using the sender FQDN, and read the PLMN IDs configured in the database for the sender FQDN.

In step 908, the process includes determining that the first inter-PLMN security handshake request message fails the inter-PLMN security handshake validation procedure. Selective inter-PLMN security handshake validator 804 may determine that the message fails the validation procedure if the originator of the message is not authorized to register one or more of the PLMN IDs carried in the message. For example, if the sender FQDN read from the message is not present in inter-PLMN security handshake validation database 808 or, if the sender FQDN read from the message is present in inter-PLMN security handshake validation database 808 and any of the PLMN IDs read from the PLMN ID list in the message are not present in the database entry corresponding to the sender FQDN, inter-PLMN security handshake validator 804 may determine the message fails the inter-PLMN security handshake validation procedure.

In step 910, the process includes, in response to determining that the first inter-PLMN security handshake request message fails the inter-PLMN security handshake validation procedure, performing a network protective operation. For example, selective inter-PLMN security handshake validator 804 may reject an inter-PLMN security handshake request message, such as a request for initiating an N32-c security capability exchange procedure, in response to determining that an originator of the message identified by the sender FQDN is not authorized to register one or more of the PLMN IDs carried in the message Exemplary advantages of the subject matter described herein include providing security on inter-PLMN interfaces, such as the N32-c interface while reducing the amount of manual configuration required to provide security on such interfaces.

The disclosure of each of the following references is hereby incorporated herein by reference in its entirety.

REFERENCES

1. $3^{rd}$ Generation Partnership Project; Technical Specification Group Services and System Aspects; System architecture for the 5G system (5GS); Stage 2 (Release 17) 3GPP TS 23.501 V17.4.0 (2022-03)
2. $3^{rd}$ Generation Partnership Project; Technical Specification Group Services and System Aspects; Procedures for the 5G System (5GS); Stage 2 (Release 17) 3GPP TS 23.502 V17.4.0 (2022-03)
3. $3^{rd}$ Generation Partnership Project; Technical Specification Group Core Network and Terminals; 5G System; Technical Realization of Service Based Architecture; Stage 3 (Release 17) 3GPP TS 29.500 V17.6.0 (2022-03)
4. $3^{rd}$ Generation Partnership Project; Technical Specification Group Core Network and Terminals; 5G System; Principles and Guidelines for Services Definition; Stage 3 (Release 17) 3GPP TS 29.501 V17.5.0 (2022-03)
5. $3^{rd}$ Generation Partnership Project; Technical Specification Group Core Network and Terminals; 5G System; Network Function Repository Services; Stage 3 (Release 17) 3GPP TS 29.510 V17.5.0 (2022-03)
6. $3^{rd}$ Generation Partnership Project; Technical Specification Group Core Network and Terminals; 5G System; Public Land Mobile Network (PLMN) Interconnection; Stage 3 (Release 17) 3GPP TS 29.573 V17.4.0 (2022-03)
7. $3^{rd}$ Generation Partnership Project; Technical Specification Group Core Network and Terminals; Numbering, addressing, and identification; (Release 17) 3GPP TS 23.003 V17.5.0 (2022-03)
8. $3^{rd}$ Generation Partnership Project; Technical Specification Group Services and System Aspects; Security architecture and procedures for 5G system (Release 17) 3GPP TS 33.501 V17.5.0 (2022-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for selective inter-public land mobile network (inter-PLMN) security handshake validation, the method comprising:
   receiving, at a security edge protection proxy (SEPP), a first inter-PLMN security handshake request message, wherein receiving the first inter-PLMN security handshake request message includes receiving an Hypertext Transfer Protocol (HTTP) POST message for initiating an N32-c security capability negotiation procedure;
   performing, by the SEPP and in an SEPP trust relationship database, a lookup to determine whether the first inter-PLMN security handshake request message originates from a trusted SEPP, wherein performing the lookup in the SEPP trust relationship database includes reading SEPP-identifying information from N32-c security negotiation request data carried in the HTTP POST message and using the SEPP-identifying information read from the N32-c security negotiation request data to perform the lookup in the SEPP trust relationship database and wherein using the SEPP-identifying information read from the N32-c security negotiation request data to perform the lookup includes using a sender fully qualified domain name (FQDN) from the N32-c security negotiation request data to perform the lookup;
   determining, by the SEPP and based on the lookup, that the first inter-PLMN security handshake request message does not originate from a trusted SEPP, wherein determining that the first inter-PLMN security handshake request message does not originate from a trusted SEPP includes determining that the sender FQDN is not present or is identified as untrusted in the SEPP trust relationship database;
   in response to determining that the first inter-PLMN security handshake request message does not originate from a trusted SEPP, performing, by the SEPP, an inter-PLMN security handshake validation procedure on the first inter-PLMN security handshake request message;
   determining that the first inter-PLMN security handshake request message fails the inter-PLMN security handshake validation procedure; and
   in response to determining that the first inter-PLMN security handshake request message fails the inter-PLMN security handshake validation procedure, performing a network protective operation.

2. The method of claim 1 wherein performing the inter-PLMN security handshake validation procedure includes determining whether one or more PLMN identifiers registered with the SEPP for an originator of the first inter-PLMN security handshake request message matches one or more PLMN identifiers in the first inter-PLMN security handshake request message.

3. The method of claim 1 wherein performing the network protective operation includes rejecting the first inter-PLMN security handshake request message.

4. The method of claim 1 comprising:
   receiving, at the SEPP, a second inter-PLMN security handshake request message;
   performing, by the SEPP and in the SEPP trust relationship database, a lookup to determine whether the second inter-PLMN security handshake request message originates from a trusted SEPP;
   determining, by the SEPP and based on the lookup, that the second inter-PLMN security handshake request message originates from a trusted SEPP; and
   in response to determining that the second inter-PLMN security handshake request message originates from a trusted SEPP, processing the second inter-PLMN security handshake request message without performing the inter-PLMN security handshake validation procedure.

5. The method of claim 4 wherein receiving the second inter-PLMN security handshake request message includes receiving an HTTP POST message for initiating an N32-c security capability negotiation procedure.

6. The method of claim 4 wherein processing the second inter-PLMN security handshake request message includes registering, by the SEPP, a PLMN identifier obtained from the second inter-PLMN security handshake request as being associated with an originator of the second inter-PLMN security handshake request.

7. A system for selective inter-public land mobile network (inter-PLMN) security handshake validation, the system comprising:
a security edge protection proxy (SEPP) including at least one processor and a memory;
an inter-PLMN security handshake validation database located in the memory;
an SEPP trust relationship database located in the memory; and
a selective inter-PLMN security handshake validator executable by the at least one processor for receiving a first inter-PLMN security handshake request message, wherein the first inter-PLMN security handshake request message includes an Hypertext Transfer Protocol (HTTP) POST message for initiating an N32-c security capability negotiation procedure, the selective inter-PLMN security handshake validator for performing, in the SEPP trust relationship database, a lookup to determine whether the first inter-PLMN security handshake request message originates from a trusted SEPP, wherein, in performing the lookup in the SEPP trust relationship database, the selective inter-PLMN security handshake validator is configured to read SEPP-identifying information from N32-c security negotiation request data carried in the HTTP POST message and use the SEPP-identifying information read from the N32-c security negotiation request data to perform the lookup in the SEPP trust relationship database and wherein the SEPP-identifying information read from the N32-c security negotiation request data comprises a sender fully qualified domain name (FQDN), the selective inter-PLMN security handshake validator for determining, based on the lookup, that the first inter-PLMN security handshake request message does not originate from a trusted SEPP, wherein the selective inter-PLMN security handshake validator is configured to determine that the first inter-PLMN security handshake request message does not originate from a trusted SEPP by determining that the sender FQDN is not present or is identified as untrusted in the SEPP trust relationship database, the selective inter-PLMN security handshake validator for, in response to determining that the first inter-PLMN security handshake request message does not originate from a trusted SEPP, performing, using data in the inter-PLMN security handshake validation database, an inter-PLMN security handshake validation procedure on the first inter-PLMN security handshake request message, determining that the first inter-PLMN security handshake request message fails the inter-PLMN security handshake validation procedure, and in response to determining that the first inter-PLMN security handshake request message fails the inter-PLMN security handshake validation procedure, performing a network protective operation.

8. The system of claim 7 wherein the selective inter-PLMN security handshake validator is configured to perform the inter-PLMN security handshake validation procedure by determining whether one or more PLMN identifiers registered in the inter-PLMN security handshake validation database for an originator of the first inter-PLMN security handshake request message matches one or more PLMN identifiers in the first inter-PLMN security handshake request message.

9. The system of claim 7 wherein the selective inter-PLMN security handshake validator is configured to perform the network protective operation by rejecting the first inter-PLMN security handshake request message.

10. The system of claim 7 wherein the selective inter-PLMN security handshake validator is configured to:
receive a second inter-PLMN security handshake request message;
perform a lookup in the SEPP trust relationship database to determine whether the second inter-PLMN security handshake request message originates from a trusted SEPP;
determine, based on the lookup, that the second inter-PLMN security handshake request message originates from a trusted SEPP; and
in response to determining that the second inter-PLMN security handshake request message originates from a trusted SEPP, process the second inter-PLMN security handshake request message without performing the inter-PLMN security handshake validation procedure.

11. The system of claim 10 wherein the selective inter-PLMN security handshake validator is configured to process the second inter-PLMN security handshake request message by registering, by the SEPP, a PLMN identifier obtained from the second inter-PLMN security handshake request as being associated with an originator of the second inter-PLMN security handshake request.

12. A non-transitory computer readable medium having stored thereon executable instructions that when executed by a processor of a computer controls the computer to perform steps comprising:
receiving, at a security edge protection proxy (SEPP), a first inter-public land mobile network (inter-PLMN) security handshake request message, wherein receiving the first inter-PLMN security handshake request message includes receiving an Hypertext Transfer Protocol (HTTP) POST message for initiating an N32-c security capability negotiation procedure;
performing, by the SEPP and in an SEPP trust relationship database, a lookup to determine whether the first inter-PLMN security handshake request message originates from a trusted SEPP, wherein performing the lookup in the SEPP trust relationship database includes reading SEPP-identifying information from N32-c security negotiation request data carried in the HTTP POST message and using the SEPP-identifying information read from the N32-c security negotiation request data to perform the lookup in the SEPP trust relationship database and wherein using the SEPP-identifying information read from the N32-c security negotiation request data to perform the lookup includes using a sender fully qualified domain name (FQDN) from the N32-c security negotiation request data to perform the lookup;
determining, by the SEPP and based on the lookup, that the first inter-PLMN security handshake request message does not originate from a trusted SEPP, wherein determining that the first inter-PLMN security handshake request message does not originate from a trusted SEPP includes determining that the sender FQDN is not present or is identified as untrusted in the SEPP trust relationship database;
in response to determining that the first inter-PLMN security handshake request message does not originate from a trusted SEPP, performing, by the SEPP, an inter-PLMN security handshake validation procedure on the first inter-PLMN security handshake request message;

determining that the first inter-PLMN security handshake request message fails the inter-PLMN security handshake validation procedure; and in response to determining that the first inter-PLMN security handshake request message fails the inter-PLMN security handshake validation procedure, performing a network protective operation.

* * * * *